Feb. 1, 1938.  W. J. F. FORWARD  2,106,835
TOOL HEAD FOR MILLING MACHINES
Filed May 28, 1937  2 Sheets-Sheet 1
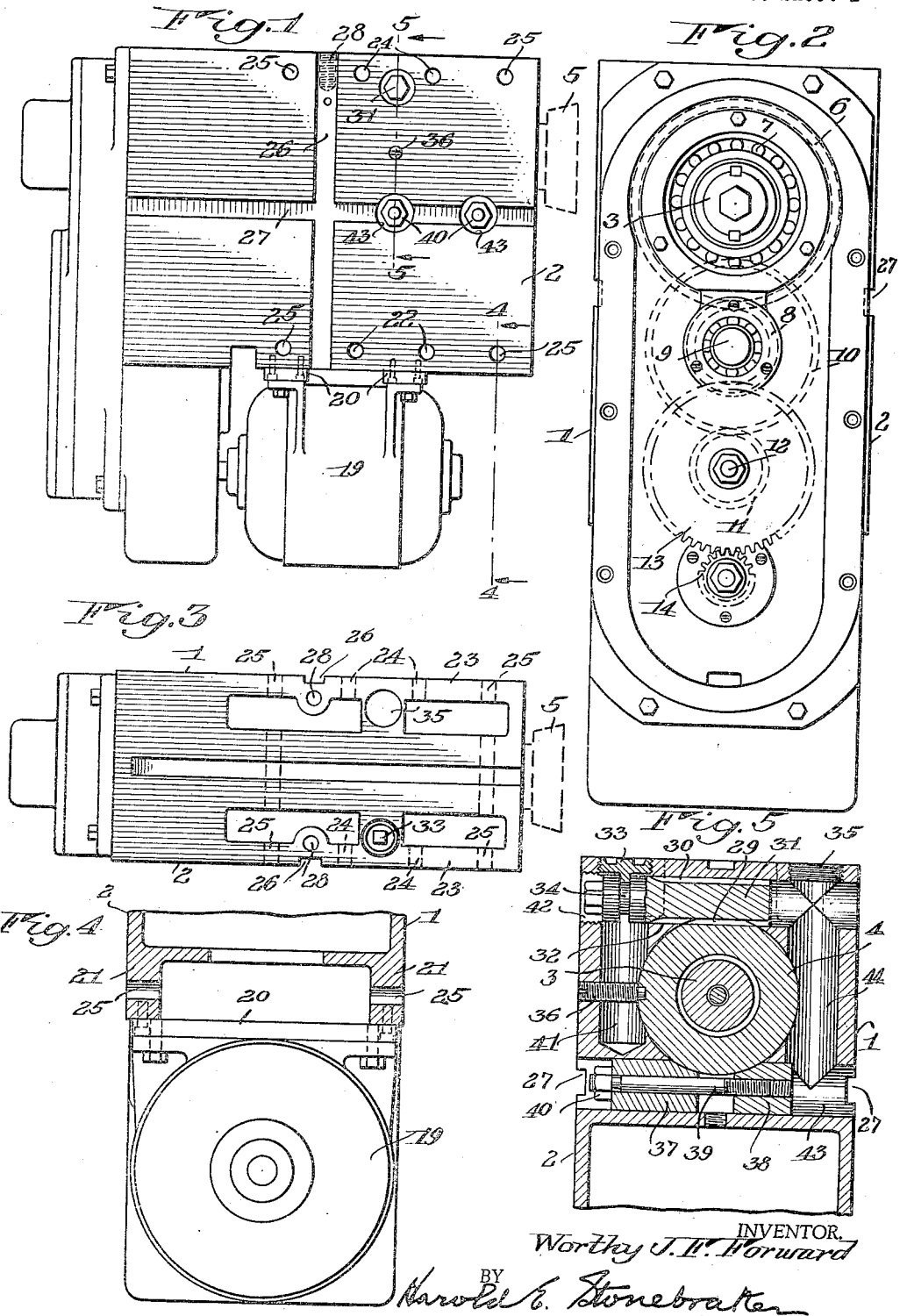
INVENTOR.
Worthy J. F. Forward
BY Harold E. Stonebraker
his ATTORNEY.

Feb. 1, 1938. W. J. F. FORWARD 2,106,835
TOOL HEAD FOR MILLING MACHINES
Filed May 28, 1937 2 Sheets-Sheet 2
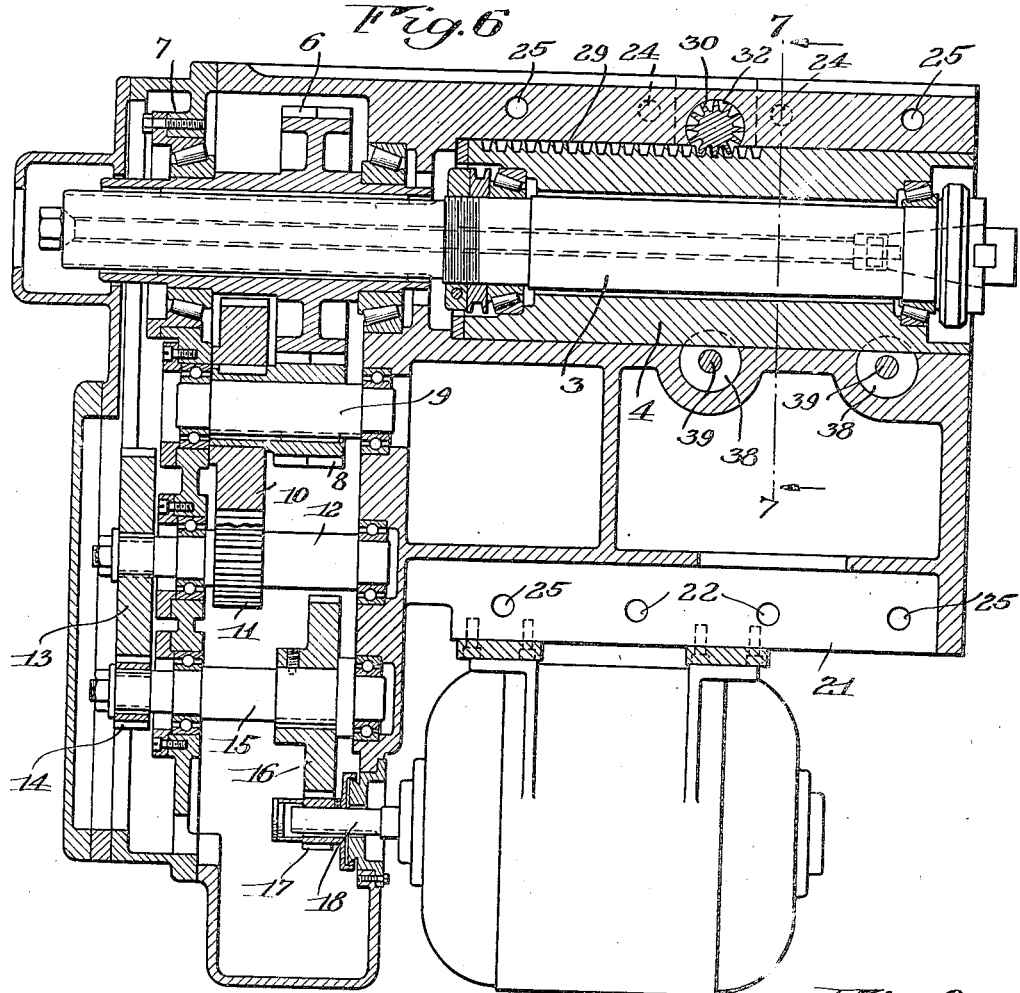
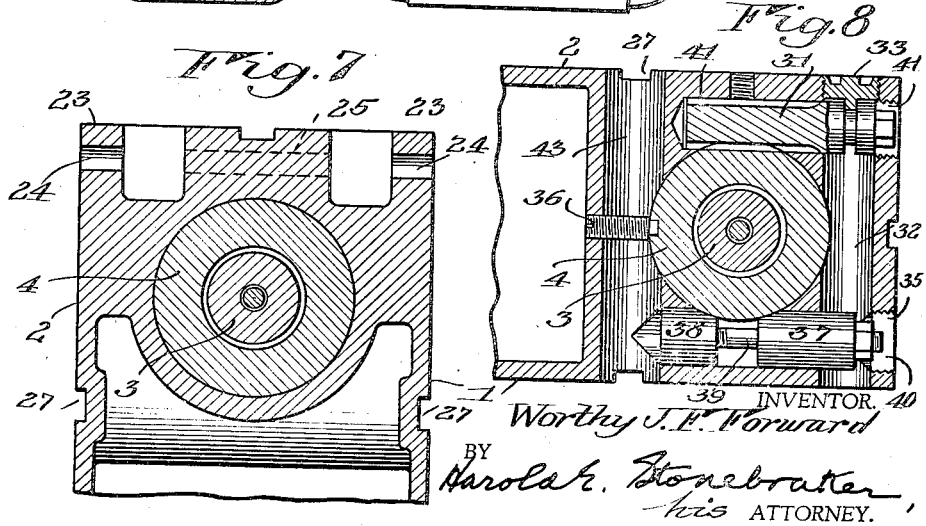
INVENTOR.
Worthy J. F. Forward
BY
Harold E. Stonebraker
his ATTORNEY.

Patented Feb. 1, 1938

2,106,835

UNITED STATES PATENT OFFICE 2,106,835

TOOL HEAD FOR MILLING MACHINES

Worthy J. F. Forward, Rochester, N. Y., assignor to Consolidated Machine Tool Corporation, Rochester, N. Y., a corporation of Delaware Application May 28, 1937, Serial No. 145,312

6 Claims. (Cl. 90—18)

This invention relates to a machine tool, with more particular reference to a tool head such as used on a milling machine, and has for its object to afford a practical and efficient form of self-contained tool head unit susceptible of a variety of applications to accommodate the needs of any particular kind of work.

In a more particular aspect, the invention has for its purpose to afford a tool head with an arrangement of tool spindle, gearing, and motor drive that makes it possible to position the head reversibly on a support, that is, with either of two attachable faces against a support, or with the head anchored between opposite members of a frame.

A further purpose of the invention is to afford a simplified and efficient gear drive that lends itself to a tool head of this character, and in which the gear drive is compactly arranged while the tool spindle is susceptible of endwise adjustment and adapted to be clamped in such adjusted position by means of instrumentalities that are reversible and controllable from either side of the head, to permit either attachable side to be secured to a support.

To these and other ends, the invention consists in the construction and arrangement of parts that will appear from the following description when read in conjunction with the accompanying drawings, the novel features being pointed out in the claims following the specification.

In the drawings:

Fig. 1 is a side elevation of a tool head constructed in accordance with a preferred embodiment of the invention;

Fig. 2 is an end elevation of the same with the gear case removed;

Fig. 3 is a top plan view;

Fig. 4 is a vertical sectional view on the line 4—4 of Fig. 1 looking in the direction indicated;

Fig. 5 is a vertical sectional view on the line 5—5 of Fig. 1 looking in the direction indicated;

Fig. 6 is a longitudinal sectional view taken centrally of the head;

Fig. 7 is a vertical sectional view on the line 7—7 of Fig. 6 looking in the direction indicated, and Fig. 8 is a view similar to Fig. 5, showing the adjusting and clamping members located to be accessible from the end of the housing.

Referring more particularly to the drawings in which like reference characters refer to the same parts throughout the several views, the structure includes a housing with opposite symmetrical sides or attaching surfaces 1 and 2, each of which is flat and adapted to be secured to a support or anchored between opposite members of a frame, permitting reversibility and universal application of the head in the manner shown in my copending application Serial No. 145,313, filed May 28, 1937.

Extending endwise of the housing is a tool spindle 3, mounted in bearings which are supported in an endwise adjustable sleeve 4, and provided at its end with the tool 5. The tool spindle is slidably keyed in a herringbone gear 6 mounted in suitable bearings 7 and driven by a herringbone pinion 8 fixed on a spindle 9 which also carries a spur gear 10. The latter is engaged and driven by a spur gear 11 on the spindle 12 which carries at its outer end a spur gear 13 driven by a spur gear 14 on a spindle 15. The latter in turn has fixed thereon a spur gear 16 engaged and driven by a spur pinion 17 fixedly mounted on the motor shaft 18 of the electric motor 19 which is carried by a bracket 20, the latter being secured at the bottom of the housing to the opposite flanges 21 thereof, as shown in Fig. 4.

It will be observed that the motor 19 is located at one edge of the housing between the opposite sides or attaching surfaces, and that the motor shaft, the several gear shafts, and the tool spindle are all arranged in a single plane, while the tool spindle is positioned intermediate the opposite flat sides of the housing, affording a compact and simplified drive that permits of reversing the housing to attach either side thereof to a support.

The flanges 21 at the bottom of the housing are provided with openings 22, and at the top of the housing are similar flanges 23 provided with openings 24 by which the sides of the housing may be bolted between opposite members of a frame, while 25 designate openings extending entirely through the flanges and housing to permit tie rods to pass through the housing for attaching the latter with either side against an upright or column of a milling machine.

26 and 27 designate intersecting keyways provided in the opposite flat sides of the housing to receive keys cooperating with keyways in a support to which the housing is attached, and 28 designate threaded openings to receive an adjusting rod, when the head is mounted on a column or upright and is to be adjusted vertically thereon.

It is essential in a tool head of this character to provide for endwise adjustment of the tool spindle, and this invention also contemplates adjusting and clamping means for the tool spindle that can be operated or controlled from either side or one end of the head, depending upon which side is secured to the support. In order to accomplish this, the adjusting sleeve 4 is provided with the rack teeth 29 which are engaged by pinion teeth 30 formed on the arbor or adjusting member 31, see Fig. 5, which is positionable in an opening 32 in the housing. 33 is a removable threaded pin engaging an annular groove 34 in the adjusting member 31 to prevent endwise movement thereof after it is once positioned. The adjusting member 31 may be inserted from either end of the opening 32 or in opening 41, as in Fig. 8, for cooperation with the rack teeth on the sleeve 4, and when inserted from the end of the opening opposite to that shown in Fig. 5, or in opening 41, the pin 33 is inserted in one of the other openings 35 or 42 provided for this purpose.

In this manner, the adjusting member 31 can always be positioned in the housing so that it is accessible from the outer surface thereof, permitting either side or one end to be attached to a support. 36 designates a threaded pin engaging a groove in the sleeve 4 to prevent turning of the latter, and 37 and 38 designate clamping members or blocks engaged by a bolt member 39 and nut 40 which can be turned to bring these clamping members into engagement with the sleeve 4 and hold the latter firmly in position after it is once adjusted. The clamping members 37 and 38 are located in openings 43 or 44 which extend through the housing, and by removing the bolt member 39, the clamping members may be reversibly positioned in the opening 43, or in opening 44, to permit the bolt member 39 to be tightened from either side, or one end, depending upon which face of the housing is attached to the support. It will be understood that both the sleeve adjusting means 31 and the clamping means are always positioned to be operated from one side of the housing, and if the head is to be reversibly attached to a support with reference to the position of these parts shown in Fig. 5, the adjusting member 31 and the clamping members are removed and inserted so as to be accessible and controlled from the opposite side of the housing.

While the invention has been described with reference to the structural arrangement shown, it is not confined to these details, and this application is intended to cover any changes or departures that may come within the purposes of the improvements or the scope of the following claims.

I claim:

1. A self-contained tool head that is reversibly attachable to a support of a machine tool, including a box-like housing having opposite flat sides which are symmetrical and reversibly attachable to said support, a tool spindle arranged within and extending between the ends of said housing and projecting beyond one end thereof, a tool supported on said spindle beyond one end of the housing, a motor located at one edge of the housing between said flat sides, and gear connections between said motor and tool spindle.

2. A self-contained tool head that is reversibly attachable to a support of a machine tool, including a box-like housing having opposite flat sides which are symmetrical and reversibly attachable to said support, a tool spindle arranged within and extending between the ends of said housing parallel to said flat sides and intermediate the same, the tool spindle projecting beyond one end of the housing, a tool supported on said spindle beyond one end of the housing, a motor located at one edge of the housing between said flat sides, a motor shaft, and gears and gear spindles arranged at one end of the housing and connecting said motor shaft and tool spindle, the motor shaft, gear spindles, and tool spindles being located in a single plane between said flat sides and parallel to each other.

3. A tool head adapted to be adjustably positioned in relation to the table and support of a machine tool and including a box-like housing having opposite flat sides for attachment to a support, a tool spindle arranged within and extending between the ends of said housing and projecting beyond one end thereof to support a tool, a motor located at one edge of the housing between said flat sides, and gear connections between said motor and tool spindle, said flat sides both including flanges at their edges having openings permitting either side to be attached to the support.

4. A tool head adapted to be adjustably positioned in relation to the table and support of a machine tool and including a box-like housing having opposite flat sides which are selectively attachable to a support, a tool spindle arranged within and extending between the ends of said housing, an endwise adjustable sleeve in which said spindle is mounted, and adjusting means positionable in either of said opposite sides of the housing and operatively associated with said sleeve.

5. A tool head adapted to be adjustably positioned in relation to the table and support of a machine tool and including a box-like housing having opposite flat sides which are selectively attachable to a support, a tool spindle arranged within and extending between the ends of said housing, an endwise adjustable sleeve in which said spindle is mounted, adjusting means positionable in either of said opposite sides of the housing and operatively associated with said sleeve, and clamping means positionable in either of said opposite sides of the housing and operable to clamp said sleeve after adjustment.

6. A tool head adapted to be adjustably positioned in relation to the table and support of a machine tool and including a box-like housing having opposite flat sides for attachment to a support, a tool spindle arranged within and extending between the ends of said housing and projecting beyond one end to support a tool, a motor located at one edge of the housing between said flat sides, a motor shaft, gears and gear spindles connecting said motor shaft and tool spindle, the motor shaft, gear spindles and tool spindle being located in a single plane between said opposite flat sides, an endwise adjustable sleeve for the tool spindle, adjusting means positionable in either of said opposite sides of the housing and operatively associated with said sleeve, and clamping means positionable in either of said opposite sides of the housing and operable to clamp the sleeve after adjustment.

WORTHY J. F. FORWARD.